UNITED STATES PATENT OFFICE.

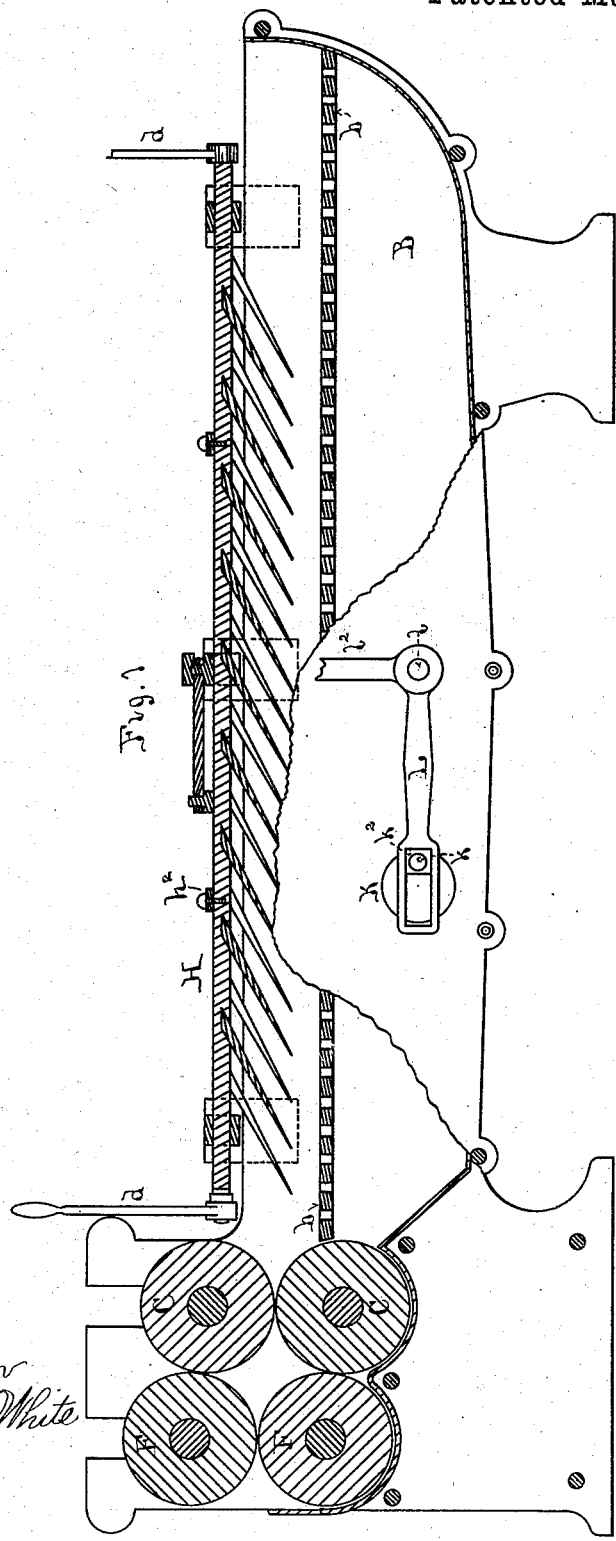

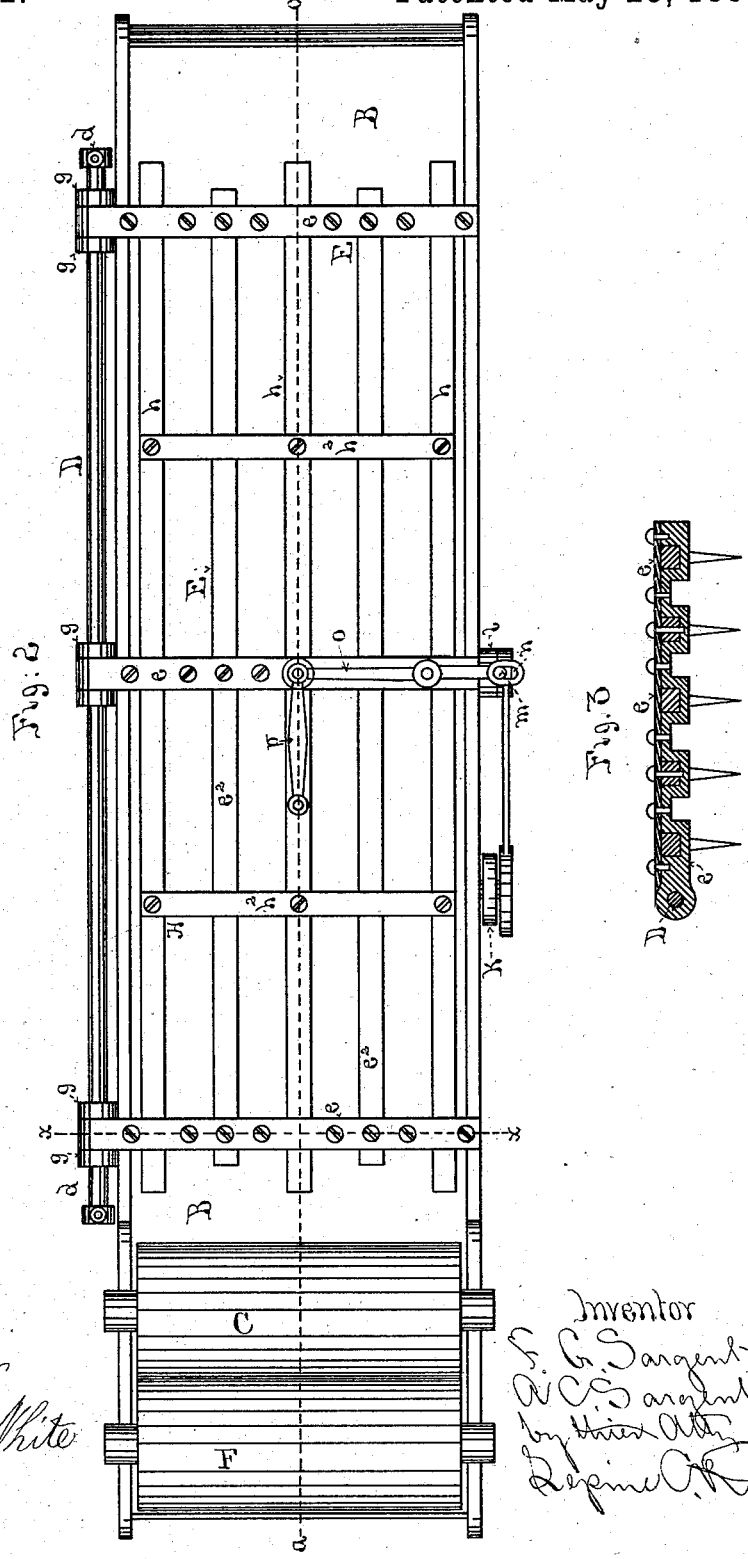

FREDERICK G. SARGENT AND ALLAN C. SARGENT, OF GRANITEVILLE, MASSACHUSETTS.

WOOL-WASHING MACHINE.

SPECIFICATION forming part of Letters Patent No. 258,322, dated May 23, 1882.

Application filed June 13, 1881. (No model.)

*To all whom it may concern:*

Be it known that we, FREDERICK G. SARGENT and ALLAN C. SARGENT, of Graniteville, in the county of Middlesex and State of Massachusetts, have invented a new and useful Wool-Washing Machine, of which the following is a specification.

Our invention relates to machines in which a scouring or cleansing fluid is placed in a tank or bowl, into which the wool is placed, and in which it is stirred or agitated by a mechanism provided for that purpose; and the objects of our invention are to provide a mechanism to forward the wool through the bowl, the moving parts of which shall not require to be lifted during such operation, and which can be readily swung upward from its operative position out of the bowl to obtain access to it. We attain these objects by the mechanism illustrated in the accompanying drawings, in which—

Figure 1 is a vertical longitudinal section on line $a\,a$ of Fig. 2. Fig. 2 is a plan view. Fig. 3 is a section of the swing-frame and rake on line $x\,x$ of Fig. 2.

B is the bowl or tank into which the scouring-liquid is placed. This bowl is provided with the perforated bottom $b$, designed to be placed at such a distance below the surface of the fluid contained in the bowl that any surcharged mass of wool passing through it will be supported so as to be kept within reach of the tines of the rake mechanism.

C C are the first pair of squeeze-rolls. F F are the second pair.

E is a swinging frame, composed of the cross-bars $e$ and longitudinal bars $e^2\,e^2$. These bars are rigidly fastened together and the frame rigidly attached by the bars $e$ to the rock-shaft D, which is provided with levers $d\,d$ and supported by bearings $g\,g$, which are attached to the side of the tank, so that the operator, by taking hold of the lever $d$, can rock the shaft D and elevate the frame E, with all its attached parts, out from the tank B and out of the way of the operator while cleansing such tank.

The slide-bars $h\,h$ are sustained by the cross-bars $e$, and slide loosely in openings made in those bars, substantially like the openings in which the fixed bars $e^2\,e^2$ are placed. The bars $h\,h\,h$ are connected by cross-bars $h^2\,h^2$, which are attached to them, forming a frame, or, when considered with the teeth belonging to it, a rake, H. The bars $e^2$ and $h$ are provided with teeth or tines reaching downward and forward at a very great angle from the perpendicular, so that when the sliding frame or rake H is moved forward toward the squeeze-rolls the wool will be caught and pulled under the frame E by the teeth of the rake, and will freely slide under the teeth or tines of the fixed frame E. The line of forward inclination of the teeth of the rake must be such that with the forward movement the wool will be caught by the teeth of the rake, and with its backward movement will slide under them, without being torn by them, and should be about sixty degrees from the perpendicular, though in some cases it may be somewhat less; but in no case should it be less than forty-five degrees.

The rake H extends substantially the entire length of the bowl, and is intended to convey the wool the entire distance it is usually carried by the rakes and carrier mechanism of wool-washing machines as usually constructed. The rake H is given a reciprocating movement by means of the pulley K, which is driven from counter-shafting. This pulley has upon it a crank or wrist pin, $k$, upon which is placed a slide-box, $k^2$, which slides in a slot in the bell-crank lever L, which moves upon a stud, $l$, attached to the side of the tank. Upon the other arm of the bell-crank lever, (marked $l^2$,) at its top, and extending upward, is a pin, $m$, which is received into the slot $n$ in the lever $o$, when the frame E is at rest upon the tank, in operative position for the rake.

The lever $o$ is connected with the rake H by a connecting-rod, $p$, so that when a movement of rotation is given to the pulley K a backward and forward movement is given to the rake H.

The operation of the machine may be thus described: The wool to be washed, being fed into the bowl at the end farthest from the squeeze-rolls by an attendant, will be seized as soon as it is crowded under the end of the reciprocating rake by the teeth of the rake and pulled under the frame E and drawn as far forward as a single movement of the rake will take it, and when the forward movement of the rake is complete and it begins its backward movement the wool will be caught by the tines attached to the bars $e^2$ $e^2$ and prevented from returning with the rake; and when the rake begins its next forward movement the wool will be taken by other teeth of the rake and again moved forward under the teeth of the frame, while more wool will be pulled under the frame, as before. The natural tendency of the wool to float keeps it in contact with the rake and frame tines and assists them to gain a ready hold upon it at each change of the direction of movement of the rake, and the elevated perforated bottom prevents the wool, when it comes into contact with the tines of the rake as it moves forward, from escaping the hold of the tines, while through the perforations the movement of the wool causes currents, which change the fouling liquid for cleaner from the body of the tank below the false or perforated bottom. The wool will by many successive movements of the carrier be made to reach the other end of the machine, where it will be fed to the squeeze-rolls, and finally pass out of the machine above the level of the liquid in the tank.

When it is desired to clean or examine the tank or any of the mechanism working therein, the operator, by means of the lever and rock-shaft, can elevate the frame attached to the shaft, carrying with it the rake-frame and its operating-lever, which, being coupled to the driving parts only by a slot inclosing a pin which extends in the line of movement of the frame as it swings upward, offers no obstruction to such removal. When the frame and rake are thus removed there remains no mechanism in or over the bowl to prevent or obstruct free access to it, and as the mechanism is both simple and light, and can therefore be made cheaply, it forms for many purposes a very desirable machine.

What we claim as new and of our invention is—

1. The combination of the tank B with the horizontally-reciprocating rake H, extending over substantially the entire portion of the bowl used to wash the wool in, provided with fixed teeth inclined forward in the line of their direction of forward movement, substantially as described.

2. The combination of the bowl B, provided with the swinging frame E, hinged to one side of it, with the sliding frame H, which extends over substantially the entire washing-space of the bowl, and is provided with forwardly-inclined teeth, substantially as described.

3. The combination of the bowl B with the rock-shaft D, supported by hinges at one side of the bowl, and provided with the hand-lever $d$, with the frame E, attached to such shaft, and the sliding frame H, provided with inclined teeth, substantially as described.

4. The combination of the tank B with a horizontally-reciprocating rake-frame provided with fixed inclined teeth, adapted to move backward and forward without being raised from the liquid in the tank, and feed the wool forward by their forward movement, and agitate it in the liquid by their backward movement, substantially as described.

FREDERICK GRANDERSEN SARGENT.
ALLAN CAMERON SARGENT.

Witnesses:
ARTHUR B. PLIMPTON,
H. W. CHURCH.